US009638981B2

(12) United States Patent
Dumais et al.

(10) Patent No.: US 9,638,981 B2
(45) Date of Patent: May 2, 2017

(54) OPTICAL SWITCH WITH IMPROVED SWITCHING EFFICIENCY

(71) Applicant: Huawei Technologies Co., Ltd., Shenzhen (CN)

(72) Inventors: Patrick Dumais, Ottawa (CA); Lukas Chrostowski, Vancouver (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

(21) Appl. No.: 14/630,093

(22) Filed: Feb. 24, 2015

(65) Prior Publication Data
US 2016/0246157 A1 Aug. 25, 2016

(51) Int. Cl.
| G02F 1/035 | (2006.01) |
| G02F 1/225 | (2006.01) |
| G02F 1/015 | (2006.01) |
| G02F 1/21 | (2006.01) |

(52) U.S. Cl.
CPC .... *G02F 1/2257* (2013.01); *G02F 2001/0152* (2013.01); *G02F 2001/212* (2013.01); *G02F 2203/60* (2013.01)

(58) Field of Classification Search
None
See application file for complete search history.

(56) References Cited

U.S. PATENT DOCUMENTS 7,606,447 B2\* 10/2009 Wada ................ G02B 6/12007
385/131
8,280,201 B2\* 10/2012 Prosyk .................... G02F 1/225
359/237

(Continued)

FOREIGN PATENT DOCUMENTS

| CN | 102566090 A | 7/2012 |
| JP | H0561077 A | 3/1993 |

(Continued)

OTHER PUBLICATIONS

Foreign Communication From a Counterpart Application, PCT Application No. PCT/CN2015/097218, English Translation of International Search Report dated Mar. 1, 2016, 8 pages.

(Continued)

*Primary Examiner* — Tina Wong
(74) *Attorney, Agent, or Firm* — Conley Rose, P.C.

(57) ABSTRACT

An optical device comprises a first optical coupler configured to receive a light signal and provide a first output and a second output, a first optical waveguide in optical communication with the first output and configured to provide a first optical path for a first portion of the light signal, and a second optical waveguide in optical communication with the second output and configured to provide a second optical path for a second portion of the light signal, wherein the first optical waveguide is configured to provide a phase differential between the first optical path and the second optical path, wherein the second optical waveguide is positioned according to a lateral thermal diffusion length associated with the first optical waveguide, and wherein the lateral thermal diffusion length is a spreading distance of a thermal effect in a direction about perpendicular to the first optical path.

20 Claims, 7 Drawing Sheets

(56) References Cited

U.S. PATENT DOCUMENTS

2013/0170782 A1* 7/2013 Evans .................... G02F 1/225
385/3
2013/0266257 A1 10/2013 Li

FOREIGN PATENT DOCUMENTS

JP          2004020909 A     1/2004
JP       20060276323 A   10/2006

OTHER PUBLICATIONS

Foreign Communication From a Counterpart Application, PCT Application No. PCT/CN2015/097218, English Translation of Written Opinion dated Mar. 1, 2016, 4 pages.

Van Campenhout, J., et al. "Low-power, 2×2 silicon electro-optic switch with 110-nm bandwidth for broadband reconfigurable optical networks," Optics Express, vol. 17, No. 26, Dec. 16, 2009, OSA, pp. 24020-24029.

Xing, J., et al., "Nonblocking 4×4 silicon electro-optic switch matrix with push-pull drive," Optical Society of America, Optics Letters/vol. 38, No. 19/Oct. 1, 2013, pp. 3926-3929.

Dong, P., et al., "Submilliwatt, ultrafast and broadband electro-optic silicon switches," Optics Express, vol. 18, No. 24, Nov. 22, 2010, OSA, pp. 25225-25231.

* cited by examiner

OPTICAL SWITCH WITH IMPROVED SWITCHING EFFICIENCY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical networks are data communication networks in which information is transmitted as light signals. Optical network circuits may be built from a plurality of optical devices and/or components, such as optical fibers, optical switches, optical switch matrixes, optical couplers, and/or optical amplifiers. Optical switches are optical components that enable light signals in optical fibers and/or optical network circuits to be selectively switched and/or routed from one circuit to another. Optical switch matrixes are optical components that enable simultaneous selective connections of multiple input fibers to multiple output fibers.

Silicon photonics may refer to the application of silicon as an optical medium for optical devices. Recently, silicon photonic devices have gained interest in research and industry since silicon photonic devices may be fabricated by employing standard commercial fabrication processes (e.g., complementary metal-oxide-semiconductor (CMOS) fabrication process) and may provide electronic-photonic integration on a single integrated circuit. Silicon nanowire optical waveguides may provide a suitable platform for building photonic components and/or devices for optical communications. Some examples of silicon based optical devices may include optical modulators, optical transmitters, coherent receivers, optical switches, optical switch matrixes, and/or optical cross-connects.

SUMMARY

In one embodiment, the disclosure includes an optical device comprising a first optical coupler configured to receive a light signal and provide a first output and a second output, a first optical waveguide in optical communication with the first output and configured to provide a first optical path for a first portion of the light signal, and a second optical waveguide in optical communication with the second output and configured to provide a second optical path for a second portion of the light signal, wherein at least the first optical waveguide is configured to provide a phase differential between the first optical path and the second optical path, wherein the second optical waveguide is positioned within a lateral thermal diffusion length associated with the first optical waveguide, and wherein the lateral thermal diffusion length is a spreading distance of a thermal effect in a direction about perpendicular to the first optical path.

A method comprising coupling a first optical waveguide to an optical splitter to provide a first optical path for a first portion of light split from a light signal, wherein the first optical waveguide is implanted with dopants that cause an injection of free carriers upon an electrical field, and wherein the injection of free carriers is associated with a thermal effect that spreads within a lateral thermal diffusion length in a direction about perpendicular to the first optical path, coupling a second optical waveguide to the optical splitter to provide a second optical path for a second portion of light split from the light signal, and positioning the second optical waveguide such that the second optical waveguide and the first optical waveguide are about parallel and are separated by a distance based on the lateral thermal diffusion length.

In yet another embodiment, the disclosure includes an optical device comprising a first optical coupler configured to receive a light signal and provide a first output and a second output, a first optical waveguide in optical communication with the first output and configured to provide a first optical path for a first portion of the light signal, and a second optical waveguide in optical communication with the second output and configured to provide a second optical path for a second portion of the light signal, wherein the first optical waveguide is doped with dopants to provide a phase differential between the first optical path and the second optical path, and wherein the first optical waveguide and the second optical waveguide are further configured to extend together in a first direction, and then turn to a second direction opposite to the first direction without intersecting each other.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

One approach to implementing a silicon based optical phase modulator may be based on the plasma dispersion effect in silicon. The plasma dispersion effect may refer to the effect of free carrier density on the silicon refractive index, where a change in carrier density may change the silicon refractive index. Free carrier density may be changed and/or controlled via carrier injection or carrier depletion, where carrier injection may inject free carriers into a semiconductor material (e.g., by forward biasing a p-i-n junction) and carrier depletion may remove charge carriers from the semiconductor material (e.g., by reverse biasing a p-i-n junction).

The refractive index of a silicon optical waveguide may determine an incidence angle or an optical path (e.g., bent or refracted) of a light signal as the light signal enters the waveguide, as well as a phase velocity of the light signal as the light signal propagates in the waveguide. Thus, a change in refractive index may induce a phase shift in the light signal.

An interferometer may be constructed from a pair of silicon optical waveguides, in which the refractive index of one or both of the optical waveguides may be altered (e.g., by changing the free carrier density) to generate a phase differential between the pair of waveguides. Depending on the phase differential, the output light signals from the waveguides may be recombined more efficiently (e.g., constructive interference), less efficiently, or not at all (e.g., destructive interference). Thus, an optical switch may be built upon such constructive and/or destructive recombination of light signals to provide an on state and/or an off state for switching light signals between optical network circuits. Some examples of interferometers may include MZIs and/or Michelson's interferometers.

Figure 1:
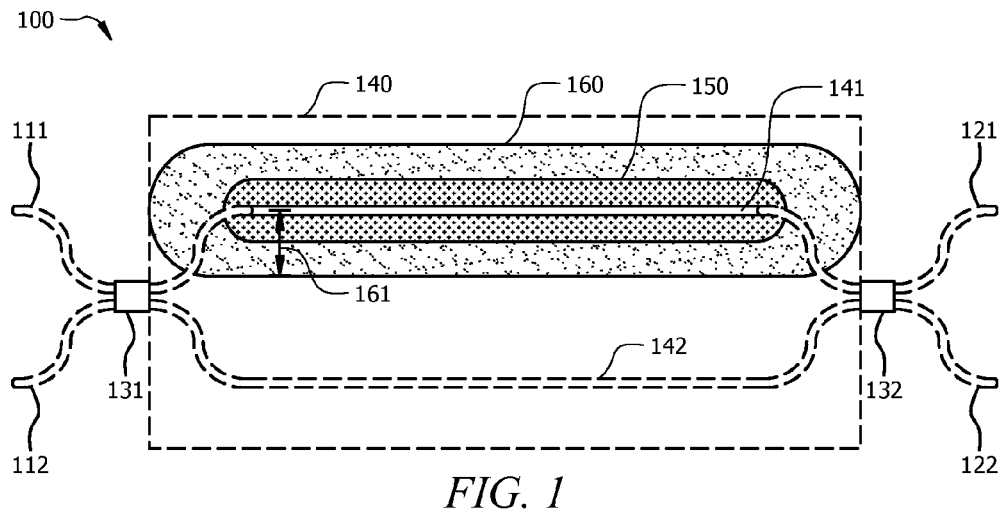
FIG. 1 is a schematic diagram of an embodiment of a Mach Zehnder Interferometer (MZI) optical switch.

FIG. 1 is a schematic diagram of an embodiment of an MZI optical switch 100. The switch 100 may comprise input waveguides 111 and 112, output waveguides 121 and 122, a first optical coupler 131, a second optical coupler 132, and an optical delay section 140. The components may be arranged as shown or in any other suitable manner. The optical delay section 140 may comprise an active waveguide 141, a passive waveguide 142, and a phase shifter 150.

The input waveguides 111 and 112 and the output waveguides 121 and 122 may be any optical devices and/or components configured to direct and guide light signals along an optical path. For example, the input waveguides 111 and 112 and the output waveguides 121 and 122 may be optical fibers, optical waveguides, and/or silicon nanowire optical waveguides.

The first optical coupler 131 may be any optical device and/or component configured to split a light signal into a first portion and a second portion. For example, the first optical coupler 131 may be a power splitter that splits an input signal into two portions, each comprising a substantially similar power. The first optical coupler 131 may be coupled to the input waveguides 111 and 112. Specifically, the first optical coupler 131 may receive a light signal via each of the input waveguides 111 and 112 and may split each received light signal into a first portion and a second portion. The first optical coupler 131 may be coupled to the optical delay section 140 and may transmit the first portion of the received light signal to the active waveguide 141 and the second portion of the received light signal to the passive waveguide 142.

The optical delay section 140 may be configured to provide an optical path difference between the light signals travelling in the active waveguide 141 and the passive waveguide 142. The active waveguide 141 and the passive waveguide 142 may be substantially similar to the input waveguides 111 and 112 and/or output waveguides 121 and 122. However, the active waveguide 141 may be coupled to the phase shifter 150 to provide a phase differential or relative phase difference between the optical paths in the active waveguide 141 and the passive waveguide 142. The optical delay section 140 may be coupled to the second optical coupler 132. The second optical coupler 132 may be substantially similar to the first optical coupler 131, but may be configured to recombine the light signals propagated through the active waveguide 141 and the passive waveguide 142 instead of splitting a light signal as in the first optical coupler 131.

It should be noted that the active waveguide 141 and the passive waveguide 142 may be referred to as interferometer arms (e.g., MZI or Michelson's interferometers) since interference between the active waveguide 141 and the passive waveguide 142 may affect the recombination of the light signals at the second optical coupler 132. Interference may include any changes (e.g., lengths, temperatures, refractive indexes, phases, intensities, and/or delays) that may alter the optical paths in the active waveguide 141 and the passive waveguide 142.

In the optical delay section 140, the phase shifter 150 may provide a phase differential between the active waveguide 141 and the passive waveguide 142 by introducing a phase shift to the optical path in the active waveguide 141. The phase differential may determine the recombination of the light signals at the second optical coupler 132, and thus may control the outputs at the output waveguides 121 and 122. For example, when light signals travelling in the active waveguide 141 and the passive waveguide 142 comprise a substantially same phase (e.g., causes a constructive recombination), the light signal received from the input waveguide 111 may be directed to the output waveguide 122 and the light signal received from the input waveguide 112 may be directed to the output waveguide 121. However, when light signals travelling in the active waveguide 141 and the passive waveguide 142 comprise a phase differential of about 180 degrees (e.g., causes a destructive recombination), the light signal received from the input waveguide 111 may be directed to the output waveguide 121 and the light signal received from the input waveguide 112 may be directed to the output waveguide 122. As such, the switch 100 may control the phase shifter 150 to provide an on state or an off state for an input light signal.

The phase shifter 150 may introduce a phase shift to the optical path in the active waveguide 141 by carrier injection (e.g., forward biasing a p-i-n junction). When dopants are implanted in silicon, free carriers may be injected into the silicon upon an electric field (e.g., an applied voltage) and may decrease the silicon refractive index, as discussed more fully below. However, the carrier injection may introduce a thermal effect. For example, the carrier injection may increase the temperature of the active waveguide 141, and the heat associated with the temperature increase may diffuse in a region 160 surrounding the active waveguide 141 (e.g., similar to a heat source) and/or radially from the side of the active waveguide 141. The thermal diffusion may extend a lateral thermal diffusion length 161, for example, a thermal spreading distance in a direction about perpendicular to the optical path in the active waveguide 141, in which the temperature is at about 20 percent of the maximum temperature increase relative to background at the center of the active waveguide 141. When the active waveguide 141 and the passive waveguide 142 are positioned about parallel and separated by a large distance (e.g., about 500 micrometers (μm)), the thermal diffusion may not reach the passive waveguide 142.

Since an increase in temperature may increase the silicon refractive index, the thermal effect may oppose and/or limit the carrier injection effect. As such, when the switch 100 controls an on state and/or an off state of a light signal by selectively adjusting the phase shift, the thermal effect may reduce a switching power efficiency of the switch 100. Several designs of carrier injection based MZI optical switches may focus on improving crosstalk between the interferometer arms, reducing footprints and/or total power consumption of the MZI optical switches, but may not address the thermal effect caused by the carrier injection.

Disclosed herein is a carrier injection MZI optical switch that focuses on improving a switching power efficiency of the optical switch. A carrier injection MZI optical switch may comprise two interferometer arms (e.g., silicon optical waveguides), where at least one of the interferometer arms may be configured for carrier injection such that a phase difference may occur between light signals travelling in the two interferometer arms to enable a constructive interference or a destructive interference at output ports of the switch. Since carrier injection may introduce a thermal effect that opposes the carrier injection effect, the switching power efficiency may be improved by reducing a temperature differential between the two interferometer arms. In an embodiment, the two interferometer arms may be separated by a distance comparable or substantially smaller than a lateral thermal diffusion length (e.g., less than about 10 μm) such that the temperature differential between the two interferometer arms may be reduced or substantially equalized. In another embodiment, the two interferometer arms may be configured in a folded structure to further reduce the temperature differential. In the folded structure, the two interferometer arms may be bent together at an angle of about 180 degrees in a plurality of S-shaped bends. Carrier injection may be generated by implanting dopants in silicon, for example, generating a forward bias p-i-n junction. The cross-sectional area (i.e., doping regions, junction width, etc.) of a carrier injection based waveguide may be optimized to further improve the switching power efficiency. The disclosed carrier injection MZI optical switch may be employed for implementing large switch matrixes, at which power efficiency may be an important factor. It should be noted that the present disclosure may describe the embodiments in the context of a 2×2 MZI optical switch, but the disclosed mechanisms may be applicable to any other interferometer-based optical switches and any other switch arrangements (e.g., an N×N switch, where N is any positive integer).

Figure 2:
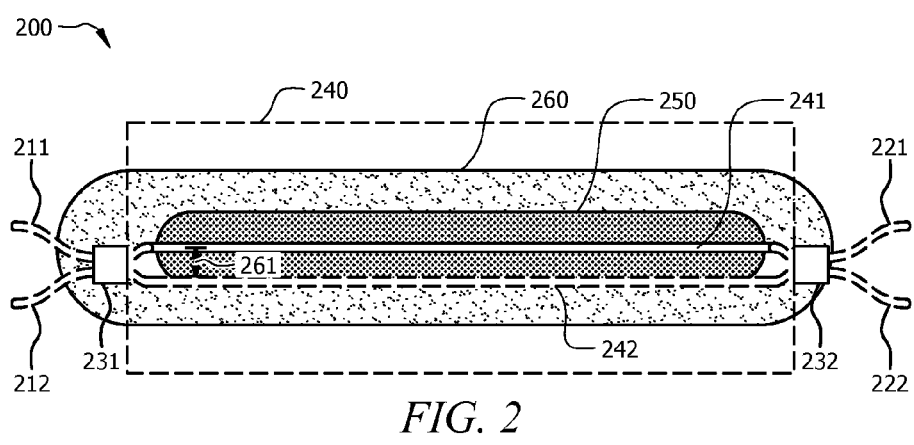
FIG. 2 is a schematic diagram of an embodiment of an MZI optical switch configured according to a lateral thermal diffusion length.

FIG. 2 is a schematic diagram of an embodiment of an MZI optical switch 200 configured according to a lateral thermal diffusion length. The switch 200 may comprise a structure substantially similar to switch 100, but may be configured according to a lateral thermal diffusion length associated with carrier injection. For example, the switch 200 may comprise input waveguides 211 and 212, output waveguides 221 and 222, a first optical coupler 231, a second optical coupler 232, and an optical delay section 240 comprising an active waveguide 241, a passive waveguide 242, and a phase shifter 250. The input waveguides 211 and 212, the output waveguides 221 and 222, the first optical coupler 231, the second optical coupler 232, the active waveguide 241, the passive waveguide 242, and the phase shifter 250 may be substantially similar to input waveguides 111 and 112, output waveguides 121 and 122, first optical coupler 131, second optical coupler 132, active waveguide 141, passive waveguide 142, and phase shifter 150, respectively. However, the active waveguide 241 and the passive waveguide 242 in the optical delay section 240 may be configured to position at a separation distance substantially closer than the separation distance between the active waveguide 141 and the passive waveguide 142 of switch 100.

As described above, carrier injection may introduce a phase shift, but may generate a thermal effect that opposes the carrier injection effect. For example, the carrier injection may cause a thermal effect in a region 260 that spans laterally in a lateral thermal diffusion length 261. When the passive waveguide 242 is positioned at a distance comparable or substantially less than the lateral thermal diffusion length 261 (e.g., about 10 μm), at least some amount of the thermal effect may also apply to the passive waveguide 242, and thus the active waveguide 241 and the passive waveguide 242 may comprise a reduced temperature difference. As such, the switch 200 may provide an improved switching power efficiency when compared to switch 100.

It should be noted that in addition to the improved switching power efficiency, the reduction in thermal effect may improve a switching time response. For example, carrier injection based switch may provide a switching time response in an order of nanoseconds, while a thermal effect response time may be in an order of microseconds. Thus, the thermal effect may limit or increase the switching time response. As such, the switching time response may be improved by reducing the thermal effect.

In some embodiments, the optical delay section 240 may provide a phase differential by employing two active waveguides (e.g., active waveguide 241 and passive waveguide 242 coupled with another phase shifter 250) instead of one active waveguide. Such embodiments may provide a substantially similar switching power efficiency improvement when the two active waveguides are positioned at a distance substantially close to or less than the lateral thermal diffusion length 261. It should be noted that the lateral thermal diffusion length 261 may vary depending on the carrier injection process and/or the p-i-n junction in the phase shifter 250. For example, when the lateral thermal diffusion length 261 is defined as the distance at which the temperature is at about 20 percent of the maximum temperature, the lateral thermal diffusion length 261 may be about 10 μm. In some other examples, the lateral thermal diffusion length 261 may be defined as the distance at which the temperature is at about 50 percent of the maximum temperature increase relative to background, where the lateral thermal diffusion length 261 may be about 2 μm, about 5 μm, or about 7 μm.

Figure 3:
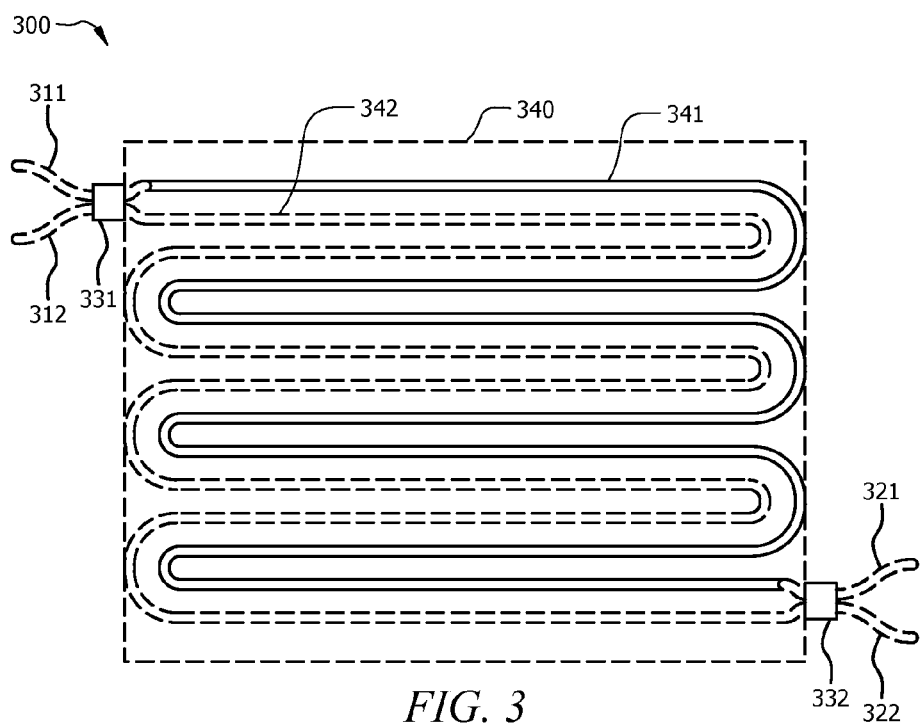
FIG. 3 is a schematic diagram of an embodiment of an MZI optical switch configured in a folded structure.

FIG. 3 is a schematic diagram of an embodiment of an MZI optical switch 300 configured in a folded structure. The switch 300 may comprise input waveguides 311 and 312, output waveguides 321 and 322, a first optical coupler 331, a second optical coupler 332, and an optical delay section 340 comprising an active waveguide 341 and a passive waveguide 342. The active waveguide 341 may be coupled to a phase shifter (not shown), similar to the phase shifter 150 and/or 250. The input waveguides 311 and 312, the output waveguides 321 and 322, the first optical coupler 331, the second optical coupler 332, the active waveguide 341, and the passive waveguide 342 may be substantially similar to input waveguides 211 and 212, output waveguides 221 and 222, first optical coupler 231, second optical coupler 232, active waveguide 241, and passive waveguide 242, respectively. However, the active waveguide 341 and the passive waveguide 342 in the optical delay section 340 may be configured to bend together at an angle of about 180 degrees (e.g., in an S-shaped curve) such that the active waveguide 341 and the passive waveguide 342 may extend in a reverse direction. For example, in the optical delay section 340, the active waveguide 341 and the passive waveguide 342 may extend from the output of the first optical coupler 331 along an axis for a distance, bend together in a reverse direction along the axis without intersecting each other, and repeat the extending and bending until the active waveguide 341 and the passive waveguide 342 reach the second optical coupler 332. As shown in the switch 300, the optical delay section 340 may comprise an interleaved pattern, where two portions of the active waveguide 341 (e.g., adjacent to each other) are interleaved with two portions of the passive waveguide 342 (e.g., adjacent to each other). The interleaved pattern may reduce temperature difference between the active waveguide 341 and the passive waveguide 342, and thus may provide an improved switching power efficiency.

Figure 4:
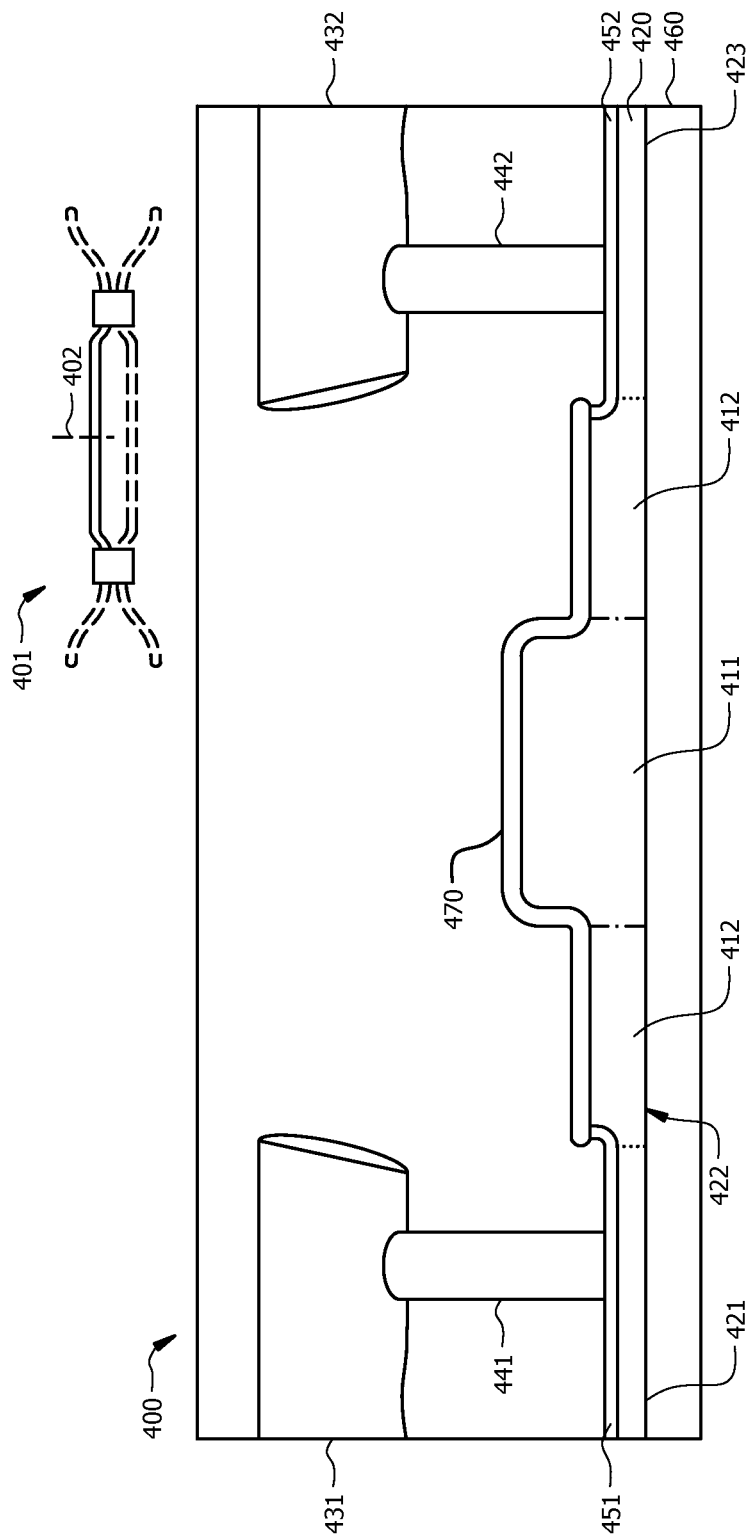
FIG. 4 is a cross-sectional view of an embodiment of a positive-intrinsic-negative (p-i-n) silicon waveguide phase modulator.

FIG. 4 is a cross-sectional view of an embodiment of a p-i-n junction silicon waveguide phase modulator 400. The phase modulator 400 may be employed in a carrier injection MZI optical switch, such as switch 100, 200, and/or 300. The phase modulator 400 may be substantially similar to active waveguide 141, 241, and/or 341 (e.g., configured with a phase shifter 150 and/or 250). A schematic view 401 of an MZI optical switch is shown in FIG. 4 to provide a reference for the cross-sectional view. For example, the cross-sectional view may correspond to a cross-sectional area along line 402. The phase modulator 400 may comprise a doped silicon layer 420 disposed on a substrate layer 460 (e.g., a silicon slab). The doped silicon layer 420 may comprise a positive-type (p) doped region 421 (e.g., implanted with p dopants) and a negative-type (n) doped region 423 (e.g., implanted with n dopants) separated by an intrinsic (i) region 422, in which a waveguide (e.g., active waveguide 141, 241, and/or 341) comprising a core 411 bounded by claddings 412 may be disposed.

The phase modulator 400 may further comprise metal connectors 431 and 432 (e.g., constructed from copper (Cu)), electrodes 441 and 442 (e.g., constructed from tungsten (W)), and ohmic contacts 451 and 452 (e.g., nickel silicide (NiSi) or aluminum). The ohmic contacts 451 and 452 may be disposed on the p doped region 421 and the n doped region 423, respectively. The electrodes 441 and 442 may be orthogonally positioned on the p doped region 421 and the n doped region 423, respectively, through the ohmic contacts 451 and 452, respectively. The metal connectors 431 and 432 may be positioned on the electrodes 441 and 442, respectively. The phase modulator 400 may further comprise an insulator layer 470 (e.g., constructed from silicon nitride ($Si_3N_4$)) disposed on the core 411 and claddings 412 (e.g., to improve surface quality of the silicon and to reduce optical loss).

When a voltage is applied across the metal connectors 431 and 432, current may flow from the metal connector 431 to the metal connector 432 and may cause free carriers (e.g., electrons and holes) to be injected into the intrinsic region 422, in which the waveguide core 411 and claddings 412 are positioned. The injection of the free carriers may change the refractive index of the waveguide core 411, and thus induces a phase shift to a light signal propagating through the waveguide core 411.

As described above, the carrier injection process may generate a thermal effect, which may oppose the carrier injection effect, and thus may reduce a switching power efficiency when employed in an MZI optical switch. One approach to improving the switching power efficiency may be to optimize the design of the cross-sectional area of the p-i-n waveguide phase modulator 400 for thermal conductivity. For example, an increase in thermal conductivity may increase the lateral thermal diffusion length of a thermal effect caused by the carrier injection, and thus may decrease a temperature differential between an active waveguide (e.g., active waveguide 141, 241, and/or 341) and a passive waveguide (e.g., passive waveguide 142, 242, and/or 342).

In an embodiment, a thermal undercut process may be applied to the phase modulator 400 to improve thermal conductivity. The thermal undercut process may refer to a process that drills holes in the substrate layer 460 and/or removes part of the substrate layer 460 (e.g., by wet etching) such that air cavities may be created between the waveguide (e.g. core 411 and/or claddings 412) and the substrate layer 460 to thermally insulate the waveguides from the substrate, and thus may effectively increase the lateral thermal diffusion length. In another embodiment, the level of dopants in the doping regions 421 and/or 423 may be decreased to improve thermal conductivity, and thus increases the lateral thermal diffusion length. In yet another embodiment, dopants may be implanted in the doping regions 421 and/or 423 with multiple levels to improve thermal conductivity and yet maintaining a minimal optical loss, where the improved thermal conductivity may increase the lateral thermal diffusion length. For example, the dopants may comprise a higher level about the center of the doping regions 421 and/or 423 and a lower level towards the edges (e.g., in contact with the waveguide claddings 412) of the doping regions 421 and/or 423.

Figure 5:
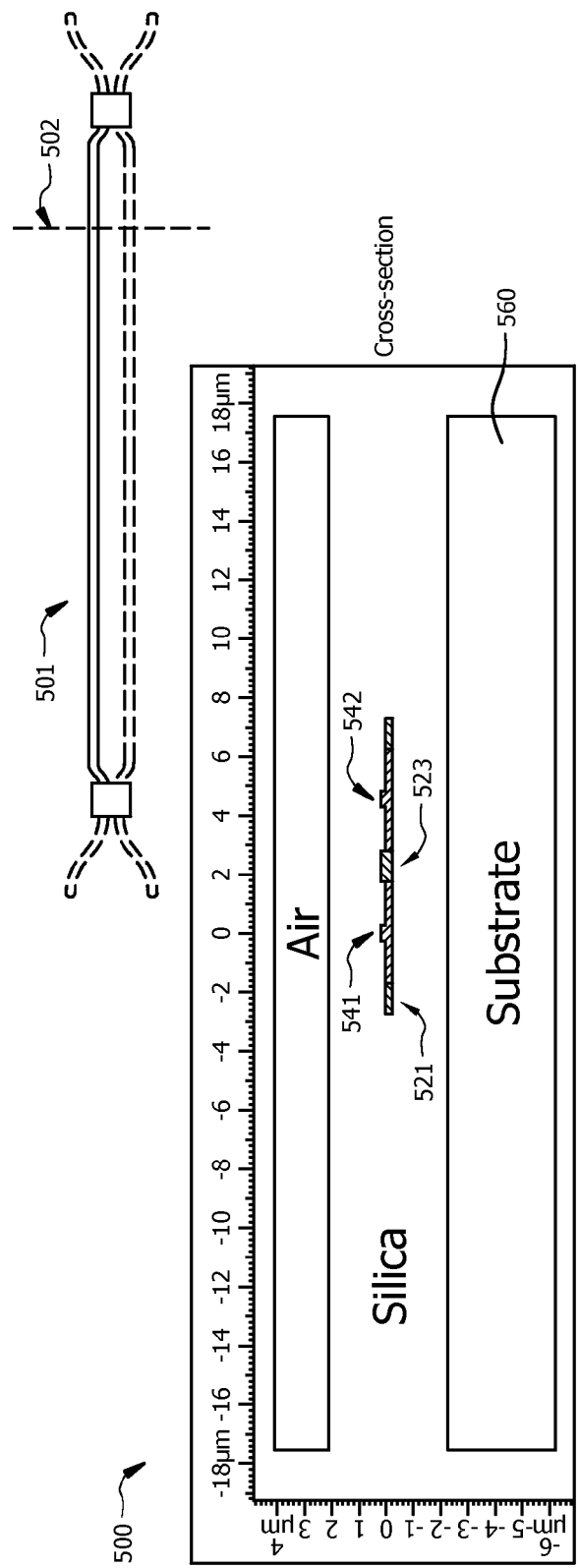
FIG. 5 is a cross-sectional view of an embodiment of an MZI optical switch configured according to a lateral thermal diffusion length.

FIG. 5 is a cross-sectional view of an embodiment of an MZI optical switch 500 configured according to a lateral thermal diffusion length. A schematic view 501 of the switch 500 is shown in FIG. 5 to provide a reference for the cross-sectional view. For example, the cross-sectional view may correspond to a cross-sectional area along line 502. The switch 500 may be substantially similar to switch 200. The switch 500 may comprise an active waveguide 541, similar to active waveguide 241 and a passive waveguide 542, similar to passive waveguide 242, positioned on a substrate layer 560, similar to substrate layer 460. The active waveguide 541 may be disposed between a p doped region 521, similar to p doped region 421 and an n doped region 523, similar to n doped region 423 for phase modulation by employing substantially similar mechanisms as described above with respect to phase modulator 400. As shown in FIG. 5, the active waveguide 541 and the passive waveguide 542 may be separated by a substantially short distance (e.g., less than about 10 µm). The short separation distance may provide a substantially small temperature differential between the active waveguide 541 and the passive waveguide 542, and thus may improve a switching power efficiency of the switch 500.

Figure 6:
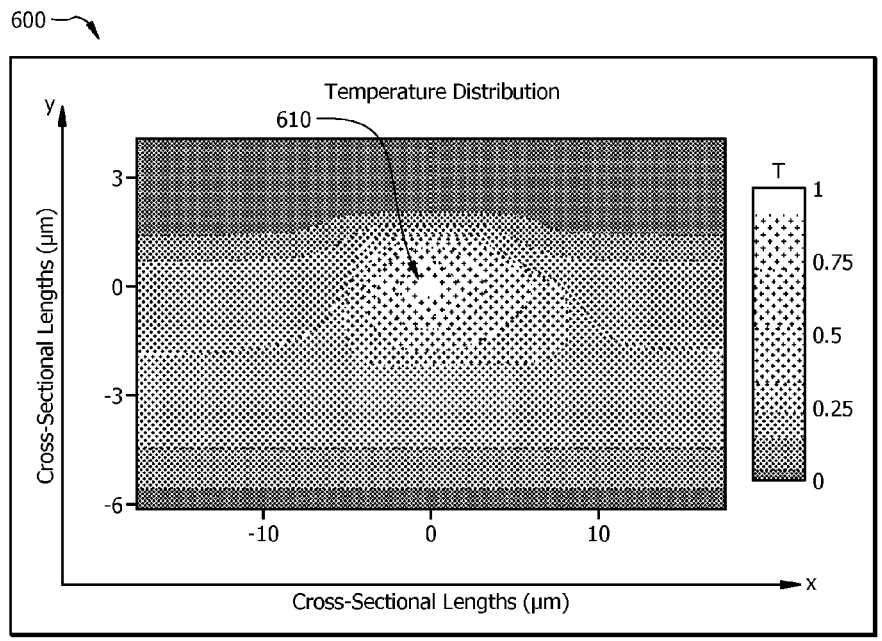
FIG. 6 is a graph showing an embodiment of a temperature distribution map at a cross-sectional area of a p-i-n silicon waveguide phase modulator.

FIG. 6 is a graph 600 showing an embodiment of a temperature distribution map at a cross-sectional area of a p-i-n junction waveguide phase modulator, such as phase modulator 400. The cross-sectional area may correspond to the cross-sectional area along line 402 in schematic view 401. In graph 600, the x-axis represents lengths (e.g., horizontal lengths) of the cross-sectional area in units of μm, the y-axis represents lengths (e.g., vertical lengths) of the cross-sectional area in units of μm, and the index of the graph 600 shows normalized temperatures (e.g., varies from about 0 to about 1, where 0 corresponds to the background temperature and 1 corresponds to the peak temperature). In graph 600, a hot spot 610 may represent the heat generated at an active waveguide (e.g., active waveguide 141, 241, 341, and/or 541) caused by carrier injection. As shown in graph 600, a peak temperature at the hot spot 610 (e.g., shown as lightest shade in FIG. 6) may be normalized to a value of about one and the temperatures may gradually reduce (e.g., shown as progressive darker shades in FIG. 6) at increasing distances from the hot spot 610. As described above, a thermal effect caused by carrier injection may reduce a switching power efficiency of an MZI optical switch (e.g., switch 200) since the thermal effect may oppose the carrier injection effect. As such, by positioning the two interferometer arms in the MZI optical switch at a distance substantially close to the lateral thermal diffusion length, the temperature differential between the two interferometer arms may be reduced, and thus may improve the switching power efficiency.

Figure 7:
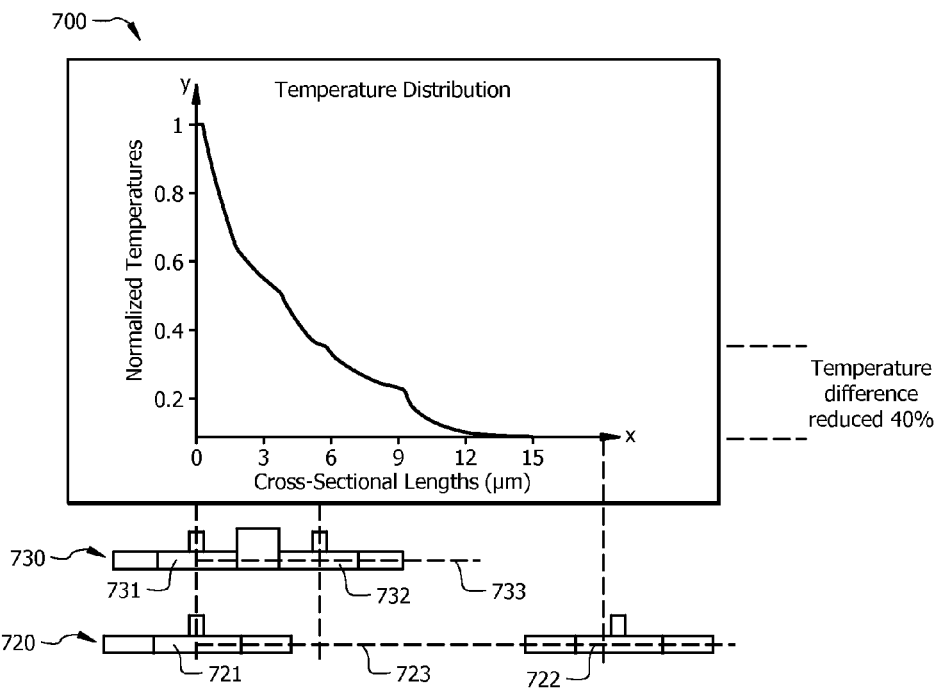
FIG. 7 is a graph showing an embodiment of a temperature distribution plot of an MZI optical switch in relation to waveguide layouts.

FIG. 7 is a graph 700 showing an embodiment of a temperature distribution plot of an MZI optical switch, such as switch 100 and/or 200, in relation to waveguide layouts 720 and 730. In the layout 720, a passive waveguide 722 (e.g., passive waveguide 142 and/or 242) may be separated from an active waveguide 721 (e.g., active waveguide 141 and/or 241) by a substantially large distance (e.g., hundreds of μm). During free carrier injection, the active waveguide 721 may produce a peak temperature at about the center of the active waveguide 721.

In the layout 730, a passive waveguide 732 may be positioned at a distance substantially close (e.g., less than about 10 μm) to an active waveguide 731. The passive waveguide 732 and the active waveguide 731 may be substantially similar to the passive waveguide 722 and the active waveguide 721, respectively. During free carrier injection, the active waveguide 731 may produce a peak temperature at about the center of the active waveguide 731, where the peak temperature at the active waveguide 731 may be substantially similar to the peak temperature at the active waveguide 721.

In graph 700, the x-axis represents lateral distances in units of μm from the center of the active waveguide 721 and/or 731 (e.g., across line 723 and/or 733) and the y-axis represents normalized temperatures (e.g., varies from about 0 to about 1). The curve 710 may represent normalized temperatures extending laterally from the center of the active waveguide 721 and/or 731. For example, the distance at 0 μm in the x-axis may correspond to the center of the active waveguide 721 and/or 731 at which the peak temperature occurs due to free carrier injection. As can be seen, the temperature trend shown in curve 710 may be substantially similar to graph 600, where the temperatures may gradually reduce at increasing distances from the center of the active waveguide 721 and/or 731. As such, the passive waveguide 722 in the layout 720 may not experience any of the thermal effect caused by the carrier injection at the active waveguide 721, and thus the temperature difference between the active waveguide 721 and the passive waveguide 722 may be large. However, the temperature difference between the waveguides 731 and 732 in the layout 730 may be significantly smaller (e.g., reduced by about 40 percent (%)) due to the substantially smaller separation distance between the waveguides 731 and 732. As described above, the temperature difference caused by the carrier injection may offset the carrier injection effect. As such, the layout 730 may provide an improved switching power efficiency when compared to the layout 720.

Figure 8:
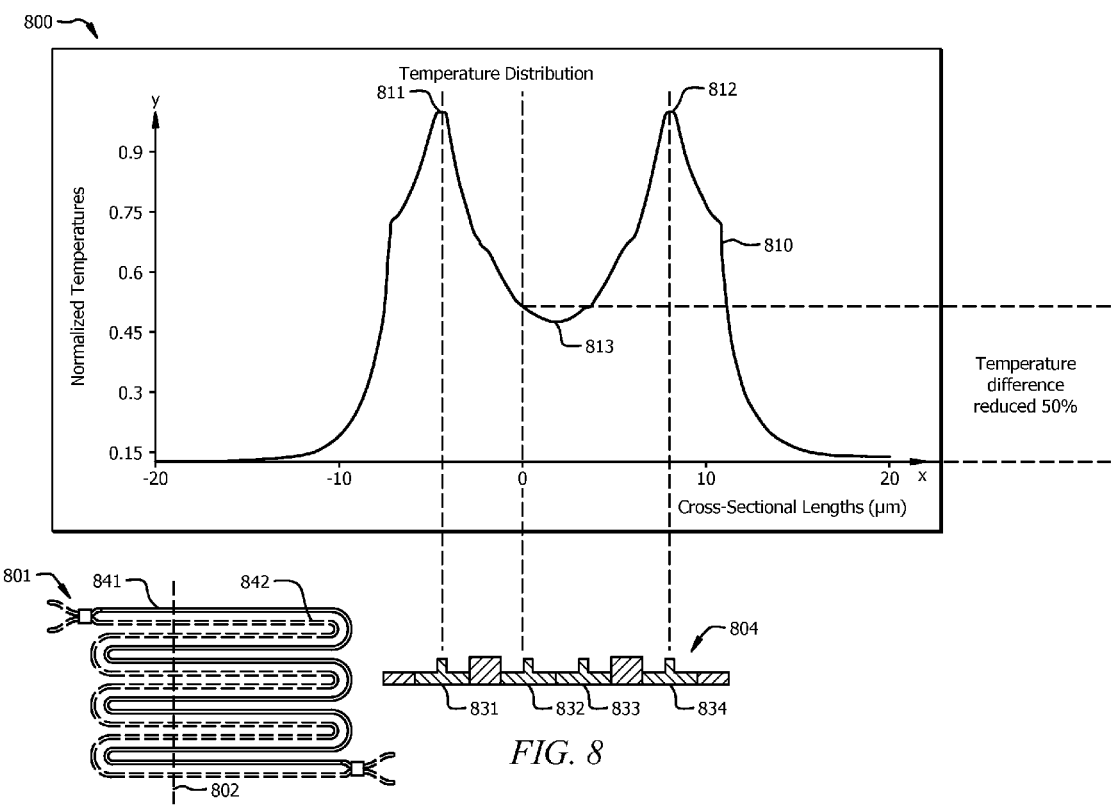
FIG. 8 is a graph showing an embodiment of a temperature distribution plot of an MZI optical switch in relation to a folded waveguide structure.

FIG. 8 is a graph 800 showing an embodiment of a temperature distribution plot for an MZI optical switch, such as switch 300, in relation to a folded waveguide structure. A schematic view 801 and a cross-sectional view 804 of the MZI optical switch are shown in FIG. 8 to provide a reference for the graph 800. In the schematic view 801, the MZI optical switch may comprise an active waveguide 841 and a passive waveguide 842 configured in a folding structure similar to the switch 300. The cross-sectional view 804 may correspond to a cross-sectional area along line 802. For example, waveguide portions 831 and 834 may correspond to portions of the active waveguide 841 along the line 802; and waveguide portions 832 and 833 may correspond to portions of the passive waveguide 842 along the line 802.

In graph 800, the x-axis represents distances in units of μm across the cross-sectional area shown in the cross-sectional view 804 and the y-axis represents normalized temperatures. The curve 810 may represent temperatures across the cross-sectional area 804. The peaks of the curve 810, for example, at points 811 and 812, may correspond to the waveguide portions 831 and 834 of the active waveguide 841. The troughs of the curve 810, for example, at point 813, may correspond to the waveguide portions 832 and 833 of the passive waveguide 842. As can be seen when comparing to layout 720 described above with respect to graph 700, the temperature difference between the active waveguide 841 and the passive waveguide 842 may be reduced by about 50 percent when the active waveguide 841 and the passive waveguide 842 are configured in a folded structure. As such, an MZI optical switch comprising a folded structure may improve switching power efficiency.

Figure 9:
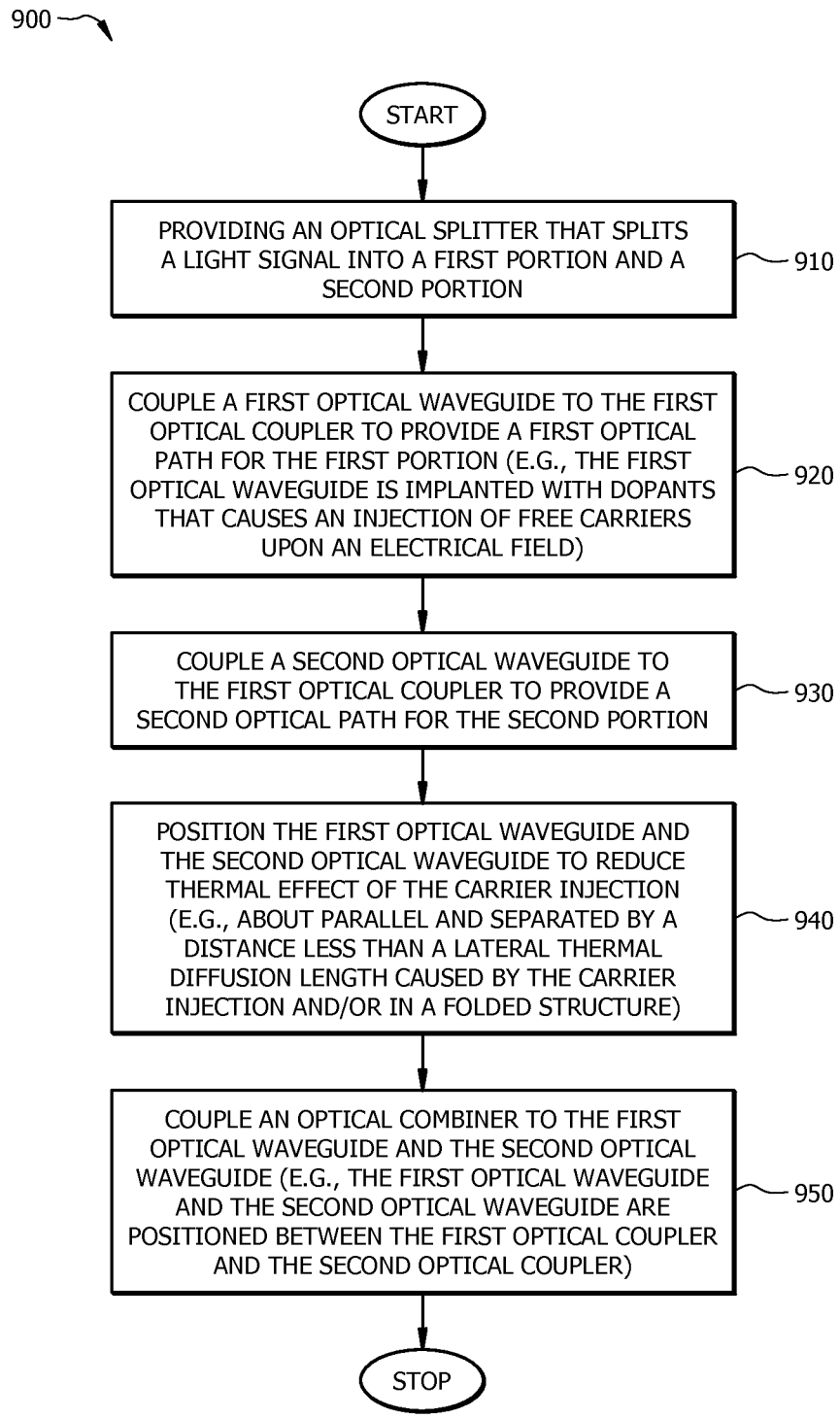
FIG. 9 is a flowchart of an embodiment of a method for configuring a MZI optical switch.

FIG. 9 is a flowchart of an embodiment of a method 900 for configuring an MZI optical switch, such as switch 200 and/or 300. The method 900 may be implemented when designing and/or manufacturing the switch 200 and/or 300. At step 910, method 900 may provide an optical splitter (e.g., first optical coupler 131, 231 and/or 331) that splits a light signal into a first portion and a second portion. At step 920, method 900 may couple a first optical waveguide (e.g., active waveguide 141, 241 and/or 341) to the optical splitter to provide a first optical path for the second light signal. The first optical waveguide may be implanted with dopants (e.g., p dopants and n dopants) on both sides of the first optical waveguide, where the dopants may cause an injection of free carriers upon an electrical field or applied voltage. The injection of free carriers may in turn generate a lateral thermal effect that diffuses within a lateral thermal diffusion length in a direction about perpendicular to the first optical path.

At step 930, method 900 may couple a second optical waveguide (e.g., passive waveguide 142, 242 and/or 342) to the optical splitter to provide a second optical path for the third light signal.

At step 940, method 900 may position the first optical waveguide and the second optical waveguide such that a thermal effect caused by the carrier injection may be reduced. For example, the first optical waveguide and the second optical waveguide may be positioned about parallel and separated by a distance substantially close to or less than a lateral thermal diffusion length of a thermal effect caused by the carrier injection. Alternatively or in addition, the first optical waveguide and the second optical waveguide may be configured in a folded structure substantially similar to optical delay section 340.

At step 950, method 900 may couple an optical combiner (e.g., second optical coupler 132, 232, and/or 332) to the first optical waveguide and the second optical waveguide. For example, the first optical waveguide and the second optical waveguide may be positioned between the optical splitter and the optical combiner.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical device comprising:
    a first optical coupler configured to receive a light signal and provide a first output and a second output;
    a first optical waveguide in optical communication with the first output and configured to provide a first optical path for a first portion of the light signal;
    a phase shifter comprising a p-i-n junction and configured to introduce a phase shift to the first optical path by a carrier injection of free carriers; and
    a second optical waveguide in optical communication with the second output and configured to provide a second optical path for a second portion of the light signal,
    wherein at least the first optical waveguide is configured to provide a phase differential between the first optical path and the second optical path,
    wherein the second optical waveguide is positioned with respect to the first optical waveguide based on the carrier injection, the p-i-n junction, and a lateral thermal diffusion length associated with the first optical waveguide,
    wherein the lateral thermal diffusion length is a spreading distance of a thermal effect in a direction about perpendicular to the first optical path, and
    wherein the lateral thermal diffusion length is a distance at which a temperature is about 20 percent (%) of a maximum temperature.

2. The optical device of claim 1, wherein the first optical waveguide is constructed from a silicon material, wherein to provide the phase differential, the first optical waveguide is doped with dopants to cause the carrier injection of the free carriers into the silicon material, and wherein the carrier injection of the free carriers causes the thermal effect.

3. The optical device of claim 2, wherein the dopants are disposed in two regions separated by the first optical waveguide, and wherein the lateral thermal diffusion length increases when a level of the dopants decreases in at least one of the regions.

4. The optical device of claim 2, wherein the dopants are disposed in two regions separated by the first optical waveguide, and wherein the lateral thermal diffusion length increases when at least one of the regions comprises a decreasing level of dopants towards the first optical waveguide.

5. The optical device of claim 1, wherein the second optical waveguide is positioned such that the second optical waveguide and the first optical waveguide are separated by a distance less than the lateral thermal diffusion length.

6. The optical device of claim 1, wherein a distance between the first optical waveguide and the second optical waveguide is less than 10 micrometers ($\mu$m).

7. The optical device of claim 1, wherein the first optical waveguide is disposed on a silicon substrate layer, and wherein the lateral thermal diffusion length increases when the silicon substrate layer is thermally undercut to form air cavities between the first optical waveguide and the silicon substrate layer.

8. The optical device of claim 1, further comprising a second optical coupler in optical communication with the first optical waveguide and the second optical waveguide, wherein the first optical waveguide and the second optical waveguide are positioned between the first optical coupler and the second optical coupler, and wherein the optical device is an N×N optical switch.

9. The optical device of claim 1, wherein the first optical waveguide and the second optical waveguide are further configured to:
    extend together in a first direction; and
    turn together to a second direction opposite to the first direction without intersecting each other.

10. The optical device of claim 1, wherein the optical device is a Mach-Zehnder interferometer.

11. The optical device of claim 1, wherein the optical device is a Michelson's interferometer.

12. A method comprising:
    coupling a first optical waveguide to an optical splitter to provide a first optical path for a first portion of light split from a light signal;
    coupling a phase shifter to the first optical waveguide, wherein the phase shifter comprises a p-i-n junction and is configured to implant the first optical waveguide with dopants that cause a carrier injection of free carriers upon an electrical field, and wherein the carrier injection is associated with a thermal effect that spreads within a lateral thermal diffusion length in a direction about perpendicular to the first optical path;
    coupling a second optical waveguide to the optical splitter to provide a second optical path for a second portion of light split from the light signal;
    determining a distance based on the carrier injection, the p-i-n junction, and the lateral thermal diffusion length; and
    positioning the second optical waveguide such that the second optical waveguide and the first optical waveguide are about parallel and are separated by the distance.

13. The method of claim 12, wherein the distance is less than the lateral thermal diffusion length.

14. The method of claim 12, wherein the distance is less than 10 micrometers.

15. The method of claim 12, further comprising:
   extending the first optical waveguide and the second optical waveguide together in a first direction; and
   turning the first optical waveguide and the second optical waveguide together to a second direction at about 180 degrees with respect to the first direction without the first optical waveguide and the second optical waveguide intersecting each other.

16. The method of claim 12, further comprising coupling an optical combiner to the first optical waveguide and the second optical waveguide such that the first optical waveguide and the second optical waveguide are positioned between the optical splitter and the optical combiner.

17. The optical device of claim 1, wherein the lateral thermal diffusion length is no more than 10 micrometers ($\mu m$).

18. The optical device of claim 1, wherein the lateral thermal diffusion length is time varying.

19. The optical device of claim 1, wherein the lateral thermal diffusion length is a distance at which a temperature is about 50 percent (%) of a maximum temperature increase relative to a background.

20. The optical device of claim 1, wherein the first optical waveguide comprises a substrate layer, and wherein the substrate layer comprises drilled holes configured to increase thermal conductivity.

* * * * *